US012605962B2

(12) United States Patent
Hwang et al.

(10) Patent No.: US 12,605,962 B2
(45) Date of Patent: Apr. 21, 2026

(54) DRIVING MODULE

(71) Applicants: Hyundai Motor Company, Seoul (KR); Kia Corporation, Seoul (KR)

(72) Inventors: Sang Woo Hwang, Seoul (KR); Min Jun Kim, Busan (KR); Jun Ho Seong, Seoul (KR); Woo Keun Park, Seongnam-Si (KR); Sehyun Chang, Suwon-Si (KR); Youngil Sohn, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 330 days.

(21) Appl. No.: 18/388,455

(22) Filed: Nov. 9, 2023

(65) Prior Publication Data
US 2024/0227436 A1     Jul. 11, 2024

(30) Foreign Application Priority Data

Jan. 9, 2023    (KR) ........................ 10-2023-0002838

(51) Int. Cl.
B60B 19/00        (2006.01)
B60B 19/12        (2006.01)
(Continued)

(52) U.S. Cl.
CPC ............ B60B 19/003 (2013.01); B60B 19/12 (2013.01); F16H 37/065 (2013.01);
(Continued)

(58) Field of Classification Search
CPC ..... B60B 19/003; B60B 19/12; F16H 37/065; F16H 57/035; F16H 57/038; B60K 17/04; B60K 17/043
See application file for complete search history.

(56) References Cited

U.S. PATENT DOCUMENTS 4,223,753 A * 9/1980 Bradbury ................. G01B 3/12
                                                        180/9.1
9,511,656 B2 12/2016 Muto et al.
(Continued)

FOREIGN PATENT DOCUMENTS

CN        105730216 A  *  7/2016    ........... B60B 19/003
CN        207644520 U      7/2018
(Continued)

*Primary Examiner* — Kip T Kotter
(74) *Attorney, Agent, or Firm* — MORGAN, LEWIS & BOCKIUS LLP

(57)        ABSTRACT
A driving module includes a housing rotatably supported about a knuckle unit, a barrel unit rotatably supported by the housing, a first rotation input unit and a second rotation input unit rotatably supported by the knuckle unit, a first gear unit engaged with the first rotation input unit to transmit a rotation force input from the first rotation input unit to the housing or the barrel unit, a second gear unit engaged with the second rotation input unit and the first gear unit to transmit a rotation force input from the second rotation input unit to the housing or the barrel unit, and a controller configured to control rotations of the first rotation input unit and the second rotation input unit independently of each other to selectively rotate the housing or the barrel unit so that a vehicle is movable in all directions.

17 Claims, 8 Drawing Sheets

(51) Int. Cl.
|  |  |
|---|---|
| *F16H 37/06* | (2006.01) |
| *F16H 57/035* | (2012.01) |
| *F16H 57/038* | (2012.01) |
| *F16H 57/02* | (2012.01) |

(52) U.S. Cl.
CPC ......... *F16H 57/035* (2013.01); *F16H 57/038* (2013.01); *F16H 2057/02043* (2013.01)

(56) References Cited

U.S. PATENT DOCUMENTS

| | | |
|---|---|---|
| 9,580,002 B2 | 2/2017 | Jochim et al. |
| 2011/0071752 A1 | 3/2011 | Takenaka et al. |
| 2012/0018232 A1 * | 1/2012 | Uehara ................. B60B 19/003 |
| | | 180/7.1 |
| 2012/0181846 A1 * | 7/2012 | Liddiard .............. B60B 19/003 |
| | | 152/209.1 |
| 2018/0236813 A1 * | 8/2018 | Ochiai .................... B60B 11/02 |
| 2019/0184737 A1 * | 6/2019 | Tadakuma ................ F16H 1/16 |
| 2024/0109366 A1 * | 4/2024 | Tsubone .............. B60K 7/0007 |

FOREIGN PATENT DOCUMENTS

| | | | | |
|---|---|---|---|---|
| CN | 208248335 U | | 12/2018 | |
| CN | 216684581 U | * | 6/2022 | |
| DE | 202016006843 U1 | * | 12/2016 | ........... B60K 17/043 |
| ES | 2391668 A1 | * | 11/2012 | ........... B60K 17/043 |
| JP | 2019-072493 A | | 5/2019 | |
| JP | 2021-162092 A | | 10/2021 | |
| KR | 2014-0040138 A | | 4/2014 | |
| KR | 10-1467081 B | | 12/2014 | |

* cited by examiner

FIG. 1

DRIVING MODULE

CROSS-REFERENCE TO RELATED APPLICATION

The present application claims priority to Korean Patent Application No. 10-2023-0002838 filed on Jan. 9, 2023, the entire contents of which is incorporated herein for all purposes by this reference.

BACKGROUND OF THE PRESENT DISCLOSURE

Field of the Present Disclosure

The present disclosure relates to a driving module, and more specifically, to a driving module that includes a pair of input shafts provided on one side, wherein as each input shaft is rotated at the same speed in opposite directions, a pair of gears engaged with and coupled to each input shaft is rotated to enable the independent rotation of a barrel, thereby selectively enabling the lateral traveling of a vehicle.

Description of Related Art

In recent years, as the field of application of mobile robots increases, the level of expectations for the mobile robots increases, and for example, there are service robots for helping the disabled, patients, and the elderly, and robots that need to perform various tasks in a complex and narrow environment.

Usually, mobile robots that are successfully applied and used in many industrial sites are mostly driven by a two independent driving wheel mechanism or a steering and driving mechanism, and the conventional robots are subject to many restrictions on their movements.

For example, in the case of the service robots, when a person assisted by the robot intends to move in an arbitrary direction, the robot may interfere with the person's movement due to its own restrictions, and for the robot to rotate or turn in a narrow place, the robot needs to move to a large space or move along a complicated route.

Therefore, omni-directional mobile robots are being studied, and because the omni-directional robots may move in three degrees of freedom (front and back, left and right, and rotation) in a two-dimensional plane by improving the motion ability of the mobile robot, the mobile robot may travel in an arbitrary direction without changing the postures of wheels, and at the present time, various types of wheels, such as an omni-directional wheel including a mecanum wheel, may be used for the omni-directional mobile robot.

However, the conventional mecanum wheels have a problem in that it is difficult to be manufactured as an injection molding integrated structure due to structural difficulties, and furthermore, because the conventional mecanum wheels have a structure that moves in a direction of the vector sum of forces generated from each driving wheel, there is a problem in that a normal operation is possible only when friction in a driving region is uniform and a loss ratio of power is large.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving module that includes a pair of input shafts provided on one side of a vehicle wheel, wherein as each input shaft is rotated at the same speed in the same direction, the rotation of a barrel by a pair of gears engaged with and coupled to each input shaft is stopped to enable the lateral traveling of a vehicle through a housing, and as each input shaft is rotated at the same speed in different directions, the barrel is rotated by the pair of gears, enabling not only the longitudinal traveling but also selectively enabling the lateral traveling of the vehicle.

A driving module according to an exemplary embodiment of the present disclosure includes a housing rotatably supported about a knuckle unit, a barrel unit rotatably supported by the housing, a first rotation input unit and a second rotation input unit rotatably supported by the knuckle unit, a first gear unit engaged with the first rotation input unit to transmit a rotation force input from the first rotation input unit to the housing or the barrel unit, a second gear unit engaged with the second rotation input unit and the first gear unit to transmit a rotation force input from the second rotation input unit to the housing or the barrel unit, and a controller configured to control rotations of the first rotation input unit and the second rotation input unit independently of each other to selectively rotate the housing or the barrel unit so that a vehicle is movable in all directions.

Herein the first rotation input unit may include a first rotation input shaft, a first spur gear fixed to the first rotation input shaft, and a first ring gear engaged with the first spur gear.

Likewise, the second rotation input unit may include a second rotation input shaft, a second spur gear fixed to the second rotation input shaft, and a second ring gear engaged with the second spur gear.

Furthermore, rotation directions and rotation speeds of the first rotation input unit and the second rotation input unit may be selectively adjusted.

Furthermore, when the first rotation input unit and the second rotation input unit rotate at the same speed in opposite directions, the rotation of the housing may be fixed, and only the barrel unit may rotate.

Furthermore, when the first rotation input unit and the second rotation input unit rotate at the same speed in the same direction, the rotation of the barrel unit may be fixed, and only the housing may rotate.

Furthermore, when the first rotation input unit and the second rotation input unit rotate at different speeds, the barrel unit and the housing may be rotated together.

Meanwhile, the barrel unit may include a first barrel portion connected to the first gear unit to rotate and a second barrel portion connected to the second gear unit to rotate.

The first barrel portion may include a plurality of barrels rotatably supported by a first side of the housing, and the second barrel portion may include a plurality of barrels rotatably supported by a second side of the housing.

Furthermore, the first barrel portion and the second barrel portion may be disposed to cross each other in a circumferential direction of the housing about a rotation axis of the housing, and may cross each other upon the rotation of the housing and may be consecutively in contact with the ground.

Furthermore, the first barrel portion and the second barrel portion may rotate in the same direction.

Meanwhile, the first gear unit may include a plurality of 1-1 gears including a first side connected to the first rotation input unit and a second side engaged with the second gear unit, a plurality of 1-2 gears engaged with the plurality of 1-1 gears, a plurality of bevel gears engaged with the plurality of 1-2 gears and provided to change a direction of a rotation force to be transmitted to the barrel unit, and a plurality of connecting belts connecting a pulley of the plurality of bevel gears and a pulley of the barrel unit.

Here, the plurality of 1-1 gears and the plurality of 1-2 gears may be rotatably supported by the housing.

Furthermore, the second gear unit may include a plurality of 2-1 gears including a first side connected to the second rotation input unit and a second side engaged with the first gear unit, a plurality of 2-2 gears engaged with the plurality of 2-1 gears, and a plurality of connecting belts connecting a pulley of the plurality of 2-2 gears and a pulley of the barrel unit.

The plurality of 2-1 gears and the plurality of 2-2 gears may be rotatably supported by the housing.

Meanwhile, the driving module may further include an actuator provided on one side of the knuckle unit and configured to transmit a torque to the first rotation input unit and the second rotation input unit.

According to an exemplary embodiment of the present disclosure, the pair of input shafts provided on one side of the vehicle wheel may be provided, wherein as each input shaft is rotated at the same speed in the same direction, the rotation of the barrel by the pair of gears engaged with and coupled to each input shaft may be stopped to enable the lateral traveling of the vehicle through the housing, and as each input shaft is rotated at the same speed in different directions, the barrel may be rotated by the pair of gears, enabling not only the longitudinal traveling but also selectively enabling the lateral traveling of the vehicle.

Therefore, according to an exemplary embodiment of the present disclosure, a separate wheel rotation space for the longitudinal traveling and the lateral traveling may be precluded, improving the utilization of the occupant's region, and the design of the vehicle body for shielding the wheel housing may be applied, also improving aerodynamic performance.

Furthermore, according to an exemplary embodiment of the present disclosure, because power may be transmitted only through the pair of input shafts provided on the one side of the vehicle wheel, the compact structure may be applied, reducing the number of components and facilitating vehicle mounting.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

4

BRIEF DESCRIPTION OF THE DRAWINGS

FIG. 1 is a view showing a driving module according to an exemplary embodiment of the present disclosure;

Figure 2:
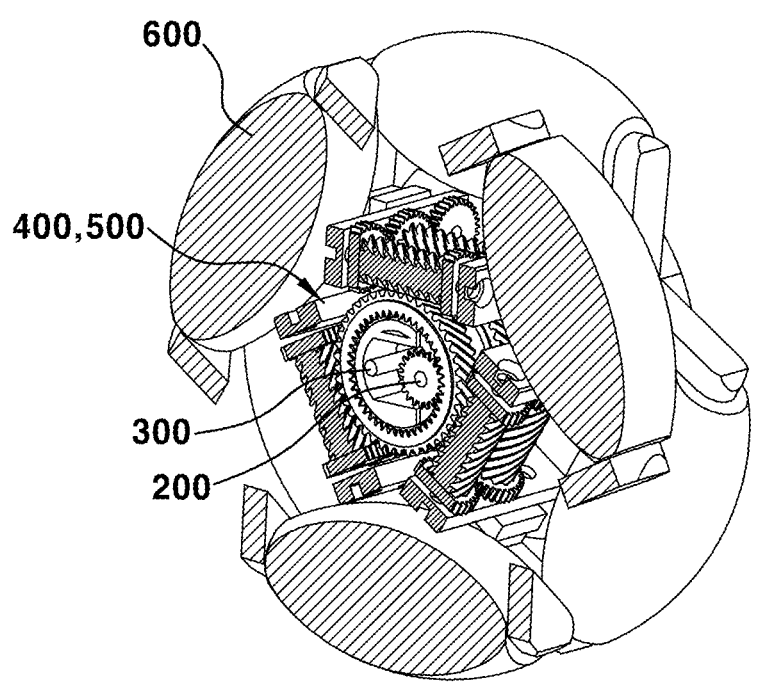
FIG. 2 is a view showing a structure of the driving module according to the exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Advantages and features of the present disclosure, and a method of achieving them will become clear with reference to the exemplary embodiments to be described below in detail together with the accompanying drawings.

However, the present disclosure is not limited by the exemplary embodiments to be included below but will be implemented in various different forms, only these embodiments are provided to complete the present disclosure of the present disclosure and completely convey the scope of the present disclosure to those skilled in the art to which the present disclosure pertains, and the present disclosure is only defined by the scope of the claims.

Furthermore, in the description of the present disclosure, when it is determined that related known technologies may obscure the gist of the present disclosure, a detailed description thereof will be omitted.

Figure 1:
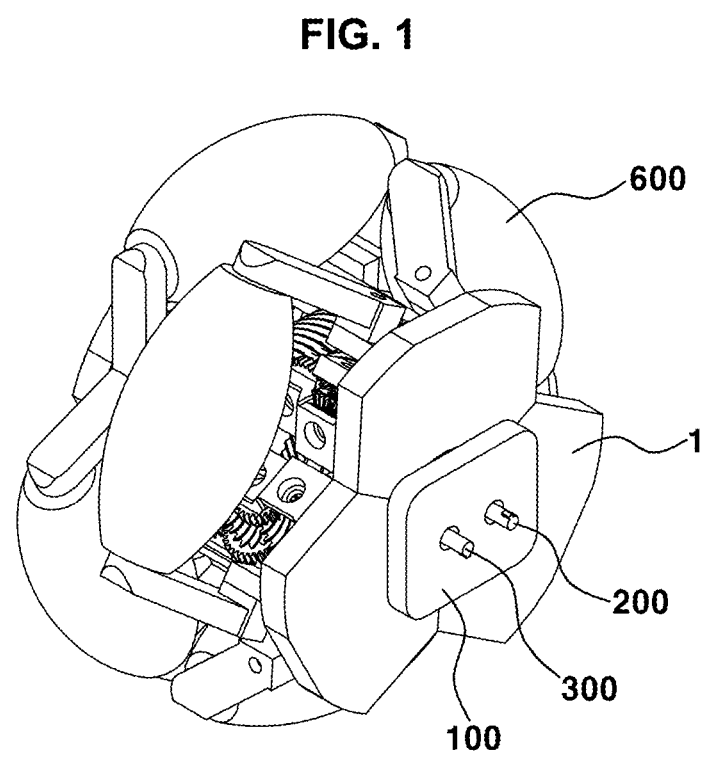
Figure 3:
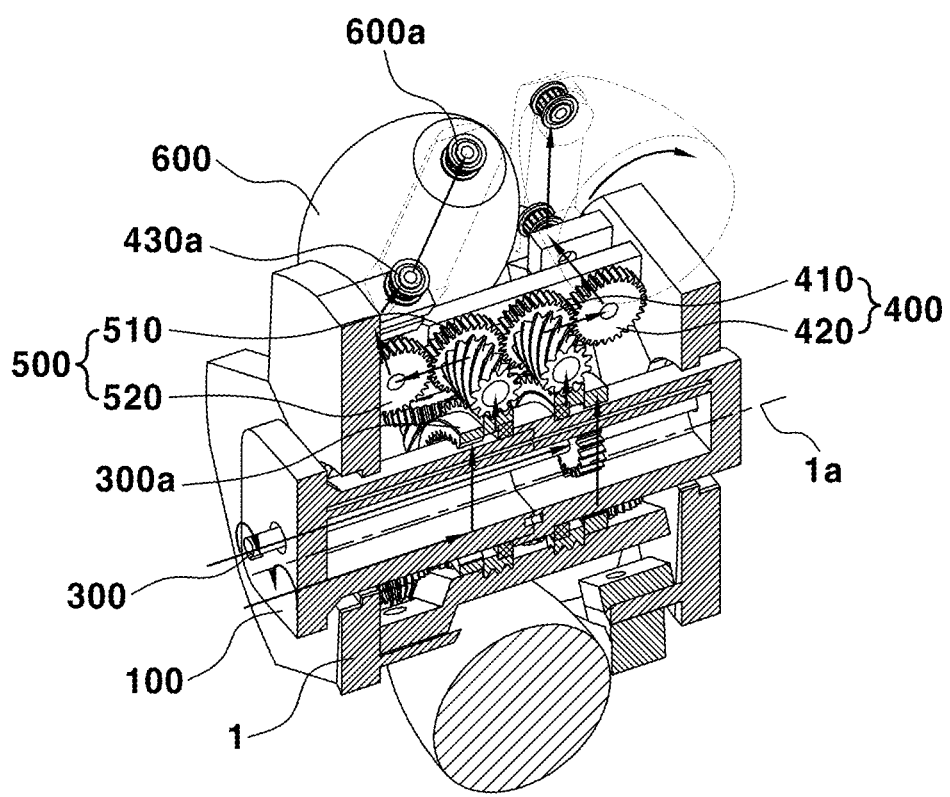
FIG. 3 is a view showing an operating state of the driving module according to the exemplary embodiment of the present disclosure.

FIG. 1 is a view showing a driving module according to an exemplary embodiment of the present disclosure, FIG. 2 is a view showing a structure of the driving module according to the exemplary embodiment of the present disclosure, and FIG. 3 is a view showing an operating state of the driving module according to the exemplary embodiment of the present disclosure.

Figure 4:
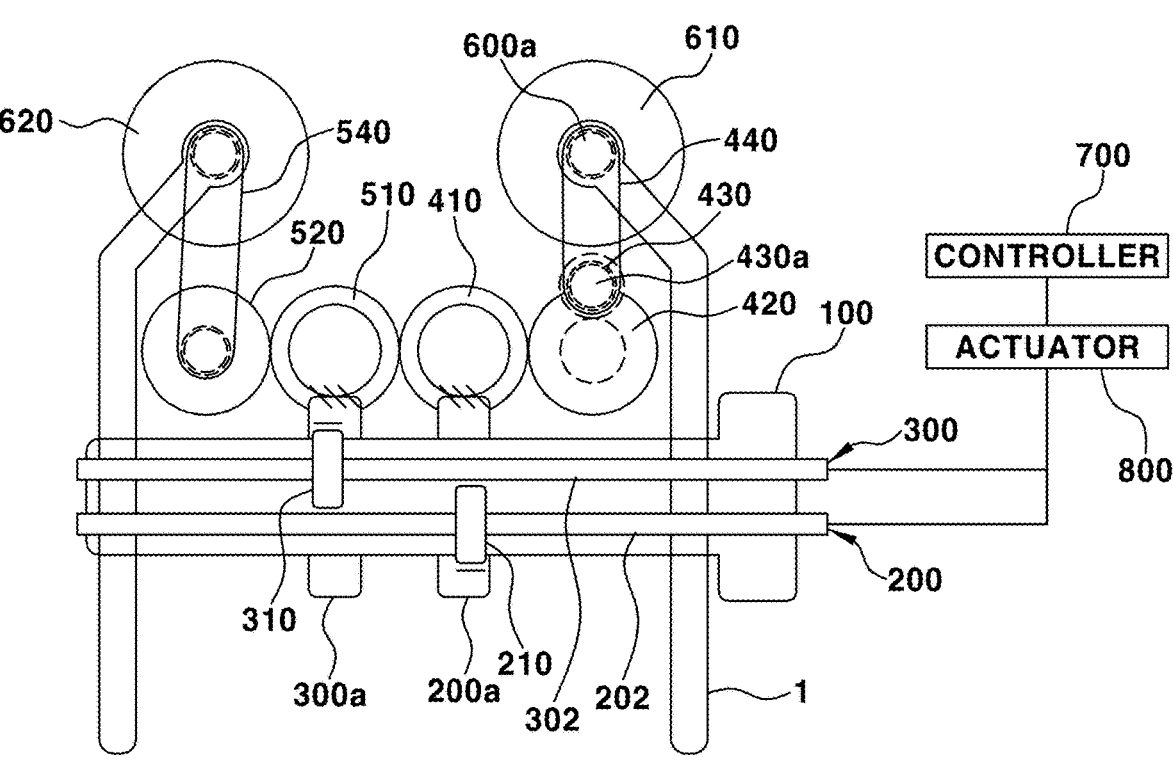
FIG. 4 is a view showing a coupling relationship of an internal structure of the driving module according to the exemplary embodiment of the present disclosure.
Figure 5:
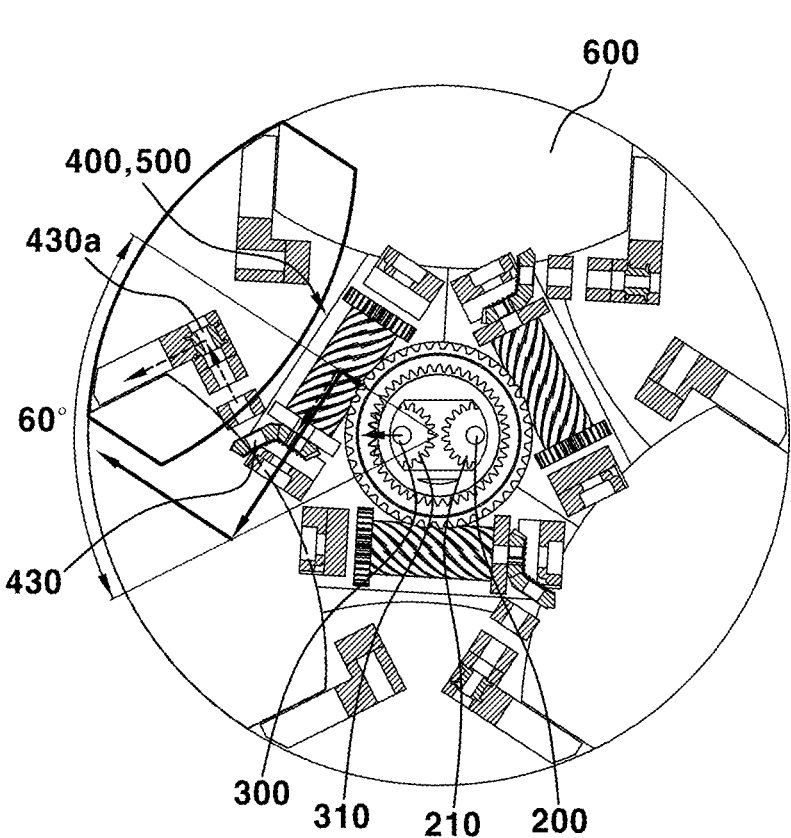
FIG. 5 is a view showing a coupled state of a barrel part to the driving module according to the exemplary embodiment of the present disclosure.
Figure 6:
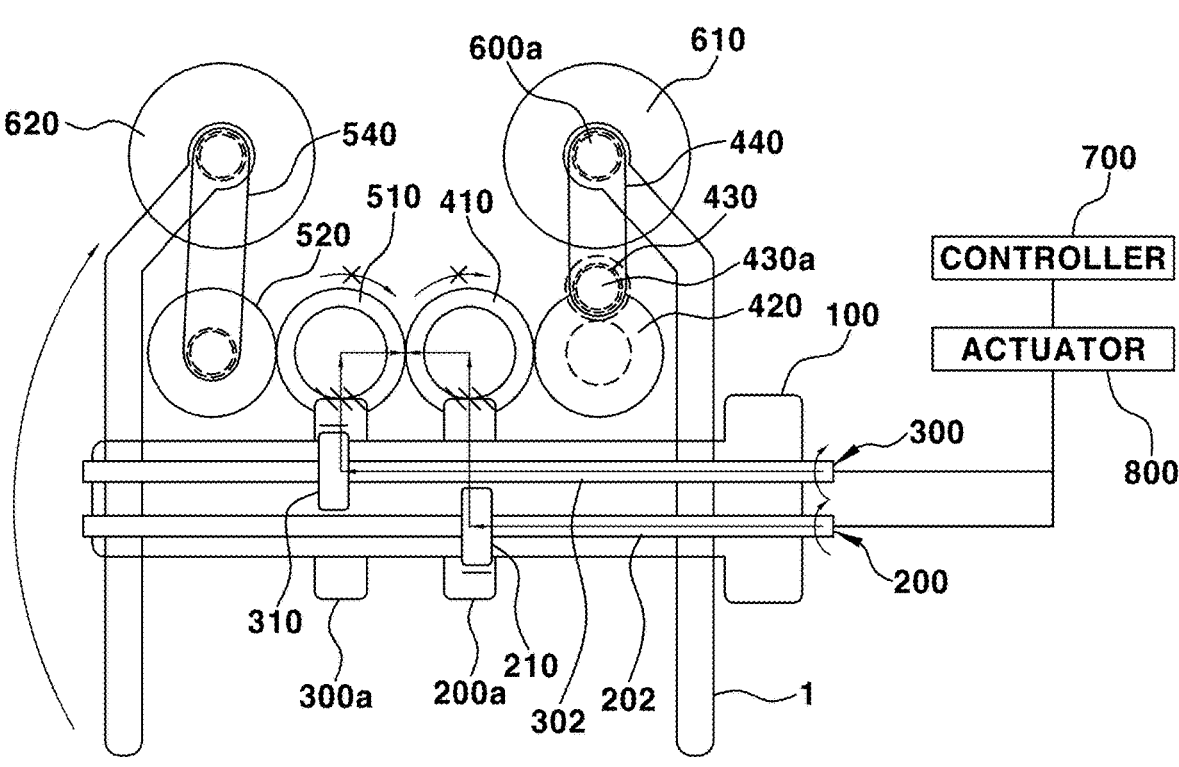
FIG. 6 is a view showing the rotation of a housing with respect to the driving module according to the exemplary embodiment of the present disclosure.

Furthermore, FIG. 4 is a view showing a coupling relationship of an internal structure of the driving module according to the exemplary embodiment of the present disclosure, FIG. 5 is a view showing a coupled state of a barrel portion to the driving module according to the exemplary embodiment of the present disclosure, and FIG. 6 is a view showing the rotation of a housing with respect to the driving module according to the exemplary embodiment of the present disclosure.

Figure 7:
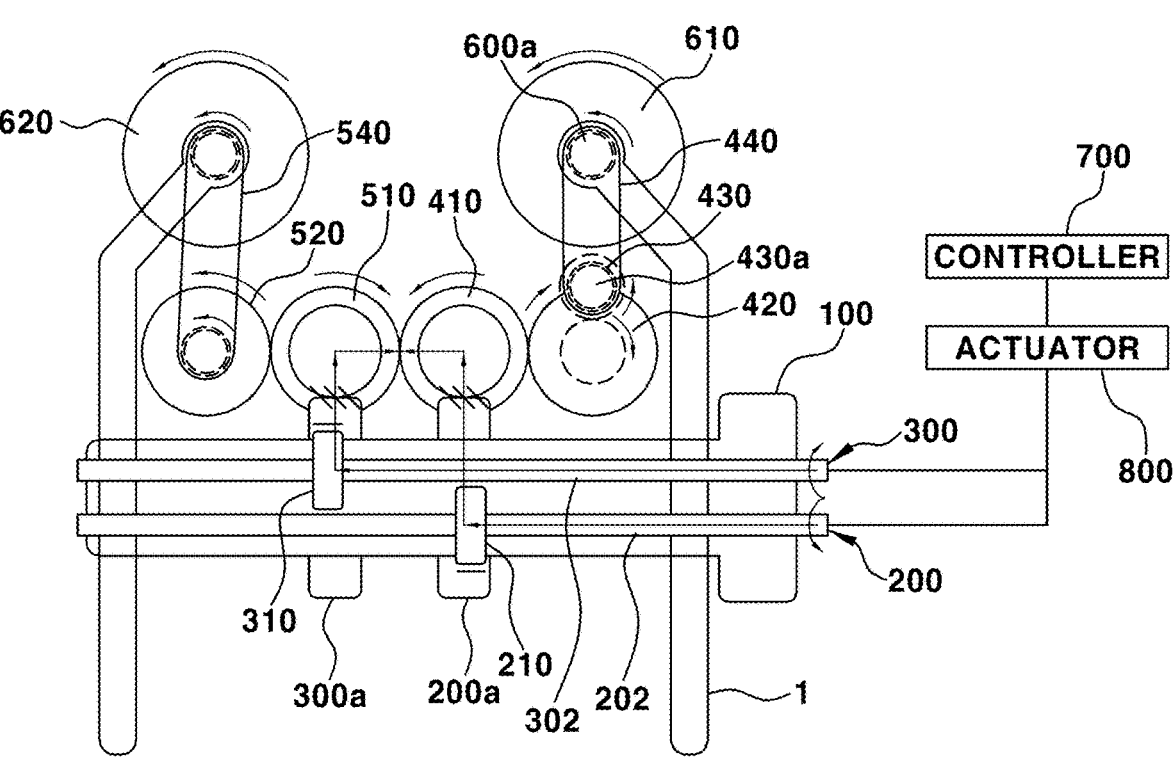
FIG. 7 is a view showing the rotation of the barrel part with respect to the driving module according to the exemplary embodiment of the present disclosure.
Figure 8:
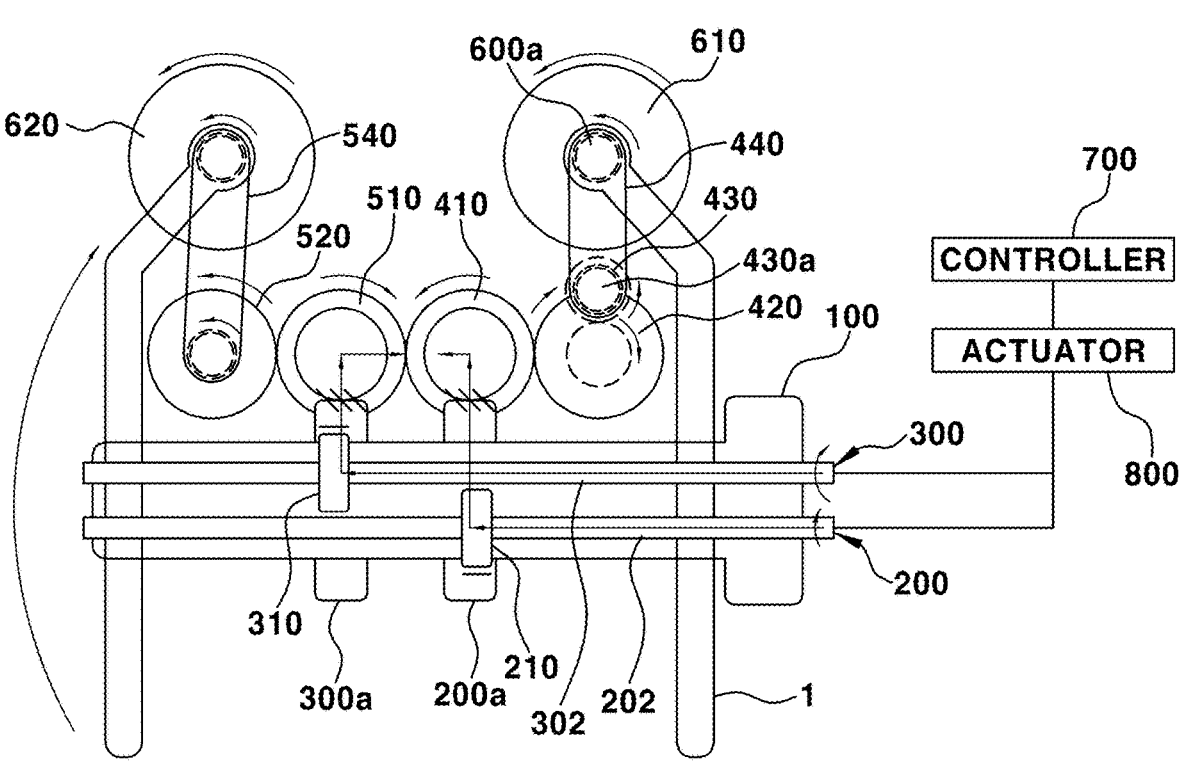
FIG. 8 is a view showing the rotation of the housing and the barrel with respect to the driving module according to the exemplary embodiment of the present disclosure.
Figure 9:
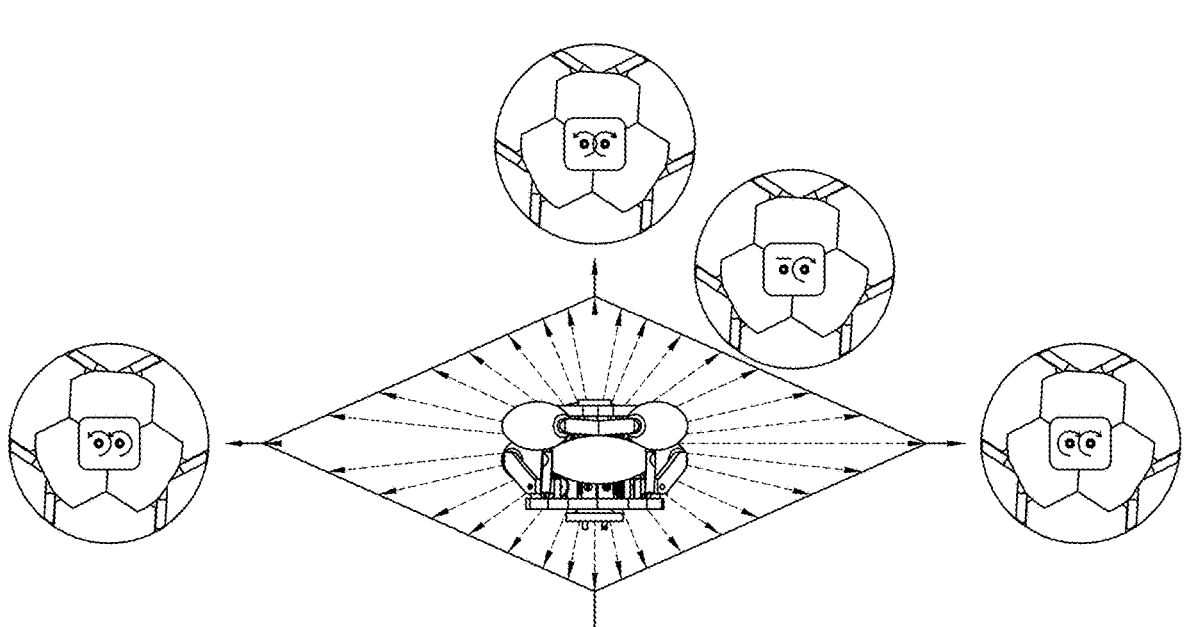
FIG. 9 is a view showing the omni-directional movement of the driving module according to the exemplary embodiment of the present disclosure.

Furthermore, FIG. 7 is a view showing the rotation of the barrel portion with respect to the driving module according to the exemplary embodiment of the present disclosure, FIG. 8 is a view showing the rotation of the housing and the barrel with respect to the driving module according to the exemplary embodiment of the present disclosure, and FIG. 9 is a view showing the omni-directional movement of the driving module according to the exemplary embodiment of the present disclosure.

As shown in FIG. 1 and FIG. 2, the driving module according to the exemplary embodiment of the present disclosure is applicable to all moving objects, such as robots, as well as vehicles and may include a knuckle unit 100, a first rotation input unit 200, a second rotation input unit 300, a first gear unit 400, a second gear unit 500, a barrel unit 600, and a controller 700.

A housing 1 is rotatably supported about the knuckle unit 100, and the knuckle unit 100 is connected to a general suspension mounted on the housing 1 to absorb a shock so that the shock of a road surface is not transmitted to a vehicle body or occupants.

Unlike the conventional friction driving method, that is, a structure in which power is transmitted to each of both sides of a wheel to determine the entire rotation driving through relative motion, the knuckle unit 100 is provided inside the housing 1, that is, on one side of the housing 1, and includes the first rotation input unit 200 and the second rotation input unit 300 formed as an input shaft for steering mounted therein.

Here, the first rotation input unit 200 and the second rotation input unit 300 may be rotatably supported by the knuckle unit 100 and provided on the one side of the housing 1, and as a torque is transmitted by an actuator 800 provided on one side of the knuckle unit 100, an input for steering may be input to one side thereof.

The first rotation input unit 200 and the second rotation input unit 300 include first and second rotation input shafts 202 and 302, first and second spur gears 210 and 310 fixed to the first and second rotation input shafts 202 and 302, and first and second ring gears 200a and 300a engaged with the first and second spur gears 210 and 310, respectively.

The first rotation input unit 200 and the second rotation input unit 300 are provided so that a forward or reverse rotation direction and rotation speed may be selectively adjusted as the knuckle unit 100 is connected to a vehicle steering system.

In other words, the first rotation input unit 200 may perform control, such as rotating at the same speed as that of the second rotation input unit 300 in an opposite direction to the second rotation input unit 300, rotating at the same speed in the same direction, or rotating at different speeds in the opposite directions.

Therefore, the first rotation input unit 200 and the second rotation input unit 300 may change the rotation direction and the rotation speed so that the housing 1 rotates, that is, a vehicle moves in a longitudinal direction or as shown in FIG. 3, rotate the barrel unit 600 together so that the vehicle moves laterally.

To the present end, the first gear unit 400 includes a plurality of gears consecutively coupled to transmit a rotation force input from the first rotation input unit 200, and as shown in FIG. 3 and FIG. 4, includes a plurality of 1-1 gears 410, a plurality of 1-2 gears 420, a plurality of bevel gears 430, and a plurality of connecting belts 440.

The 1-1 gear 410 is provided to be rotatably supported by the housing 1 together with the 1-2 gear 420 and has one side engaged with the first rotation input unit 200 and the other side engaged with the second gear unit 500.

In other words, the 1-1 gear 410 has one side engaged with and coupled to a screw of the first ring gear 200a rotated by the first spur gear 210 of the first rotation input unit 200 and the other side engaged with the second gear unit 500.

Furthermore, the 1-2 gear 420 is disposed on the same line as the 1-1 gear 410 and engaged with the 1-1 gear 410 and thus formed to rotate in an opposite direction to the 1-1 gear 410.

Furthermore, the bevel gear 430 is engaged with the 1-2 gear 420 and provided to rotate in the opposite direction to the 1-2 gear 420 to change a direction of the rotation force to be transmitted to the barrel unit 600.

In other words, the barrel unit 600 is coupled so that a plurality of first barrel portions 610 and second barrel portions 620 cross each other inside and outside the housing 1 about a rotation axis 1a, cross each other upon rotation, and is consecutively in contact with the ground. At the instant time, only when the first barrel portion 610 and the second barrel portion 620 are rotated in the same direction, the vehicle may move laterally, and considering a gear coupling structure of the first gear unit 400 and the second gear unit 500 shown in FIG. 5, because the first barrel portion 610 and the second barrel portion 620 are inevitably rotated in the opposite directions when the bevel gear 430 is omitted, the direction of the rotation force to be transmitted to the first barrel portion 610 may be changed through the configuration of the bevel gear 430 so that the rotation directions of the first barrel portion 610 and the second barrel portion 620 coupled to cross each other inside and outside the housing 1 are the same.

Furthermore, as shown in FIG. 5, the bevel gear 430 is formed in a structure in which a pair of bevel gears 430 is engaged with and coupled to each other at an angle of 60°, and thus because the plurality of first barrel portions 610 and second barrel portions 620 are coupled to cross each other inside and outside the housing 1, the torsional coupling to the first barrel portion 610 inside the housing 1 may be made and arrangement states of the plurality of first barrel portions 610 and second barrel portions 620 including an elliptical shape inside the housing 1 may form a circular edge portion.

Meanwhile, the connecting belt 440 connects a pulley 430a provided on one end portion of the bevel gear 430 and a pulley 600a of the first barrel portion 610 so that the rotation force is transmitted to the first barrel portion 610.

Furthermore, the second gear unit 500 includes a plurality of gears consecutively coupled to transmit a rotation force input from the second rotation input unit 300, and as shown in FIG. 3 and FIG. 4, includes a plurality of 2-1 gears 510, a plurality of 2-2 gears 520, and a plurality of connecting belts 540.

Here, because the 2-1 gear 510, the 2-2 gear 520, and the connecting belt 540 are used to rotate the second barrel portion 620 coupled to cross the first barrel portion 610 from the outside of the housing 1 in the same manner as a structure which is used to rotate the first barrel portion 610 coupled to the inside of the housing 1, the structural features are the same as those of the 1-1 gear 410, the 1-2 gear 420, and the connecting belt 440 of the first gear unit 400, and thus a detailed description of the corresponding components will be omitted.

The first barrel portion 610 and the second barrel portion 620 are respectively connected to the first gear unit 400 and the second gear unit 500 and selectively driven by the independent rotation of the first rotation input unit 200 and the second rotation input unit 300, implementing the lateral movement of the vehicle.

The first barrel portion 610 and the second barrel portion 620 may be configured for controlling the first gear unit 400 and the second gear unit 500 so that the first gear unit 400 is forcibly interlaced with the second gear unit 500, blocking the transmission of the rotation force, and thus the vehicle may move not only in the lateral direction but also in the longitudinal direction thereof.

In other words, because the housing 1 may be rotated about the knuckle unit 100 as the rotations of the first barrel portion 610 and the second barrel portion 620 are fixed, the transmission of the rotation force through the first gear unit 400 and the second gear unit 500 is blocked, and thus as described above, the longitudinal movement of the vehicle in a front and rear direction is available through the first barrel portion 610 and the second barrel portion 620 forming the circular edge portion.

As shown in FIGS. 4 and 6 to 8, the controller 700 may be configured for controlling the rotations and rotation speeds of the first rotation input unit 200 and the second rotation input unit 300 independently of each other, more specifically, control the rotation directions and rotation speeds of the first rotation input unit 200 and the second rotation input unit 300 to selectively rotate the housing 1 or the barrel unit 600, and thus the vehicle may move in all directions, such as the longitudinal direction, lateral direction, and the diagonal direction thereof.

Meanwhile, based on the above-described configuration, the traveling of the driving module in a plurality of directions will be described with reference to FIG. 6, FIG. 7, and FIG. 8 as follows.

Longitudinal Traveling

As shown in FIG. 6, when the first rotation input unit 200 and the second rotation input unit 300 rotate at the same speed in the same direction, the 1-1 gear 410 and the 2-1 gear 510 of each of the first gear unit 400 and the second gear unit 500 also rotate at the same speed in the same direction.

In the present state, because the 1-1 gear 410 and the 2-1 gear 510 are completely interlaced with each other and thus the gears are locked, the rotation force is not transmitted to the 1-2 gear 420 and the 2-2 gear 520, and as a result, the rotation force is not transmitted to the first barrel portion 610 and the second barrel portion 620 through the bevel gear 430 and each of the connecting belts 440 and 540.

Therefore, because the rotations of the first barrel portion 610 and the second barrel portion 620 are forcibly blocked, the lateral movement by the rotations of the first barrel portion 610 and the second barrel portion 620 is not available, and as the housing 1 is rotated along the rotation axis 1a about the knuckle unit 100 through the first barrel portion 610 and the second barrel portion 620 forming the circular edge portion as a whole (see FIG. 5), the vehicle may move in the longitudinal direction.

Lateral Traveling

As shown in FIG. 7, when the first rotation input unit 200 and the second rotation input unit 300 rotate at the same speed in opposite directions, the 1-1 gear 410 and the 2-1 gear 510 of each of the first gear unit 400 and the second gear unit 500 also rotate the same speed in opposite directions.

In the present state, because each of the 1-1 gear 410 and the 2-1 gear 510 are engaged with and coupled to each other to rotate, each of the 1-2 gear 420 and the 2-2 gear 520 rotates in the opposite direction to the 1-1 gear 410 and the 2-1 gear 510.

Therefore, the bevel gear 430 engaged with and coupled to the 1-2 gear 420 rotates counterclockwise, and the first barrel portion 610 is rotated by the connecting belt 440 connecting the pulleys 430a and 600a counterclockwise, and likewise, the second barrel portion 620 connected to the 2-2 gear 520 is also rotated by the connecting belt 540 counterclockwise, and as a result, the first barrel portion 610 and the second barrel portion 620 rotate at the same speed in the same direction.

Therefore, three first barrel portions 610 and three second barrel portions 620 coupled to the inside and outside of the housing 1, more specifically, coupled to cross each other inside and outside the housing 1, respectively, rotate at the same speed in the same direction, and thus the vehicle may move in the lateral direction.

Longitudinal and Lateral Traveling

As shown in FIG. 8, when the first rotation input unit 200 and the second rotation input unit 300 rotate at different speeds, the 1-1 gear 410 and the 2-1 gear 510 of each of the first gear unit 400 and the second gear unit 500 also rotate at different speeds.

In the present state, because the 1-1 gear 410 and the 2-1 gear 510 are interlaced with each other and thus some gears are locked, the rotation force is not completely transmitted to each of the 1-2 gear 420 and the 2-2 gear 520, and thus the rotation forces transmitted to the first barrel portion 610 and the second barrel portion 620 are inevitably limited.

Therefore, the bevel gear 430 engaged with and coupled to the 1-2 gear 420 rotates counterclockwise, and the first barrel portion 610 is rotated by the connecting belt 440 connecting the pulleys 430a and 600a counterclockwise, and likewise, as the second barrel portion 620 connected to the 2-2 gear 520 is also rotated by the connecting belt 540, the first barrel portion 610 and the second barrel portion 620 are rotated by the limited rotation force together but a difference in the rotation forces occurs.

At the present time, to solve a momentum caused by the difference in the rotation forces between the first rotation input unit 200 and the second rotation input unit 300 rotating at different speeds together with the first barrel portion 610 and the second barrel portion 620, the housing 1 also rotates about the rotation axis 1*a*, and thus the vehicle may move in both of the longitudinal direction and the lateral direction thereof.

Therefore, when any one of the first rotation input unit 200 and the second rotation input unit 300, that is, the first rotation input unit 200 rotates clockwise and the rotation force is not transmitted to the second rotation input unit 300, the difference in the rotation forces is caused by the limited rotation force transmitted to the first barrel portion 610, and for example, as shown in FIG. 9, the vehicle may move in all directions including a diagonal direction of 45°.

According to an exemplary embodiment of the present disclosure, the pair of input shafts provided on one side of the vehicle wheel may be provided, wherein as each input shaft is rotated at the same speed in the same direction, the rotation of the barrel by the pair of gears engaged with and coupled to each input shaft may be stopped to enable the longitudinal traveling of the vehicle through the housing, and as each input shaft is rotated at the same speed in different directions, the barrel may be rotated by the pair of gears, enabling not only the longitudinal traveling but also selectively enabling the lateral traveling of the vehicle.

Therefore, according to an exemplary embodiment of the present disclosure, a separate wheel rotation space for the longitudinal traveling and the lateral traveling may be precluded, improving the utilization of the occupant's region, and the design of the vehicle body for shielding the wheel housing may be applied, also improving aerodynamic performance.

Furthermore, according to an exemplary embodiment of the present disclosure, because power may be transmitted only through the pair of input shafts provided on the one side of the vehicle wheel, the compact structure may be applied, reducing the number of components and facilitating vehicle mounting.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving module comprising:
a housing rotatably supported about a knuckle unit;

a barrel unit rotatably supported by the housing;

a first rotation input unit and a second rotation input unit rotatably supported by the knuckle unit;

a first gear unit engaged with the first rotation input unit to transmit a rotation force input from the first rotation input unit to the housing or the barrel unit;

a second gear unit engaged with the second rotation input unit and the first gear unit to transmit a rotation force input from the second rotation input unit to the housing or the barrel unit; and a controller controlling rotations of the first rotation input unit and the second rotation input unit independently of each other to selectively rotate the housing or the barrel unit so that a vehicle is movable in a predetermined direction.

2. The driving module of claim 1, wherein the first rotation input unit includes:

a first rotation input shaft;

a first spur gear fixed to the first rotation input shaft; and a first ring gear engaged with the first spur gear.

3. The driving module of claim 1, wherein the second rotation input unit includes:

a second rotation input shaft;

a second spur gear fixed to the second rotation input shaft; and a second ring gear engaged with the second spur gear.

4. The driving module of claim 1, wherein rotation directions and rotation speeds of the first rotation input unit and the second rotation input unit are selectively adjusted.

5. The driving module of claim 1, wherein when the first rotation input unit and the second rotation input unit rotate at a same speed in opposite directions, a rotation of the housing is fixed, and only the barrel unit rotates.

6. The driving module of claim 1, wherein when the first rotation input unit and the second rotation input unit rotate at a same speed in a same direction, a rotation of the barrel unit is fixed, and only the housing rotates.

7. The driving module of claim 1, wherein when the first rotation input unit and the second rotation input unit rotate at different speeds, the barrel unit and the housing are rotated together.

8. The driving module of claim 1, wherein the barrel unit includes:

a first barrel portion connected to the first gear unit to rotate; and a second barrel portion connected to the second gear unit to rotate.

9. The driving module of claim 8, wherein the first barrel portion includes a plurality of barrels rotatably supported by a first side of the housing, and wherein the second barrel portion includes a plurality of barrels rotatably supported by a second side of the housing.

10. The driving module of claim 8, wherein the first barrel portion and the second barrel portion are disposed to cross each other in a circumferential direction of the housing about a rotation axis of the housing, and cross each other upon rotation of the housing and is consecutively in contact with the ground.

11. The driving module of claim 8, wherein the first barrel portion and the second barrel portion rotate in a same direction.

12. The driving module of claim 1, wherein the first gear unit includes:

a plurality of 1-1 gears rotatably supported by the housing and including a first side connected to the first rotation input unit and a second side engaged with the second gear unit;

a plurality of 1-2 gears engaged with the plurality of 1-1 gears;

a plurality of bevel gears engaged with the plurality of 1-2 gears and provided to change a direction of the rotation force to be transmitted to the barrel unit; and a plurality of connecting belts connecting a pulley of the plurality of bevel gears and a pulley of the barrel unit.

13. The driving module of claim 12, wherein the plurality of 1-1 gears and the plurality of 1-2 gears are rotatably supported by the housing.

14. The driving module of claim 12, wherein the plurality of bevel gears is formed in a structure in which a pair of bevel gears is engaged with and coupled to each other at an angle of 60°.

15. The driving module of claim 1, wherein the second gear unit includes:

a plurality of 2-1 gears including a first side connected to the second rotation input unit and a second side engaged with the first gear unit;

a plurality of 2-2 gears engaged with the plurality of 2-1 gears; and a plurality of connecting belts connecting a pulley of the plurality of 2-2 gears and a pulley of the barrel unit.

16. The driving module of claim 15, wherein the plurality of 2-1 gears and the plurality of 2-2 gears are rotatably supported by the housing.

17. The driving module of claim 1, further including an actuator provided on one side of the knuckle unit and configured to transmit a torque to the first rotation input unit and the second rotation input unit.

* * * * *